US009294499B2

(12) United States Patent
Kiessling et al.

(10) Patent No.: US 9,294,499 B2
(45) Date of Patent: Mar. 22, 2016

(54) DEFENSE COMMUNICATION MODE FOR AN APPARATUS ABLE TO COMMUNICATE BY MEANS OF VARIOUS COMMUNICATION SERVICES

(75) Inventors: Lars Kiessling, Chatillon (FR); Franck Weens, Meudon (FR); Jocelyn Barranco, Issy les Moulineaux (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 12/934,333

(22) PCT Filed: Mar. 30, 2009

(86) PCT No.: PCT/FR2009/050537
§ 371 (c)(1),
(2), (4) Date: Oct. 7, 2010

(87) PCT Pub. No.: WO2009/125151
PCT Pub. Date: Oct. 15, 2009

(65) Prior Publication Data
US 2011/0022884 A1    Jan. 27, 2011

(30) Foreign Application Priority Data
Mar. 31, 2008   (FR) ...................................... 08 52098

(51) Int. Cl.
*H04L 29/06*   (2006.01)
*H04L 29/14*   (2006.01)

(52) U.S. Cl.
CPC ............ *H04L 63/1441* (2013.01); *H04L 63/18* (2013.01); *H04L 63/08* (2013.01); *H04L 69/40* (2013.01)

(58) Field of Classification Search
CPC .................. G06F 21/12; G06F 21/50–21/51; G06F 21/55–21/56; G06F 21/60; G06F 21/82; G06F 21/88; H04L 63/14; H04L 63/1425; H04L 63/1441; H04L 63/18; H04L 63/08; H04L 69/40
USPC .............. 726/26–27, 34–35, 23, 22; 455/411; 370/338; 713/201; 709/223
See application file for complete search history.

(56) References Cited

U.S. PATENT DOCUMENTS

| | | | |
|---|---|---|---|
| 2003/0009699 A1 | 1/2003 | Gupta et al. | |
| 2005/0159823 A1* | 7/2005 | Hayes et al. | ................... 700/19 |
| 2006/0146991 A1* | 7/2006 | Thompson et al. | .......... 379/67.1 |
| 2006/0174342 A1 | 8/2006 | Zaheer et al. | |
| 2007/0165579 A1* | 7/2007 | Delibie et al. | ................ 370/338 |
| 2008/0005124 A1* | 1/2008 | Jung et al. | ....................... 707/10 |
| 2009/0260084 A1* | 10/2009 | Naccache | ....................... 726/23 |
| 2010/0227588 A1* | 9/2010 | Bradley | ....................... 455/411 |

FOREIGN PATENT DOCUMENTS

| | | | |
|---|---|---|---|
| EP | 1 533 700 A2 | 5/2005 |
| FR | 2 888 071 A1 | 1/2007 |

\* cited by examiner

*Primary Examiner* — Hadi Armouche
*Assistant Examiner* — Angela Holmes
(74) *Attorney, Agent, or Firm* — Drinker Biddle & Reath LLP

(57) ABSTRACT

An appliance communicates via a communication network via various communication services available for transmitting data via the communication network. The appliance can detect an anomaly in a communication that is established with the appliance via one of the communication services, and implement a defense communication mode. In the defense communication mode, the communications to be established with the appliance via a communication service for which a detection has occurred are inhibited, while the communications to be established via another communication service are allowed.

3 Claims, 1 Drawing Sheet

US 9,294,499 B2

DEFENSE COMMUNICATION MODE FOR AN APPARATUS ABLE TO COMMUNICATE BY MEANS OF VARIOUS COMMUNICATION SERVICES

CROSS-REFERENCE TO RELATED APPLICATIONS

This application is the U.S. national phase of the International Patent Application No. PCT/FR2009/050537 filed Mar. 30, 2009, which claims the benefit of French Application No. 08 52098 filed Mar. 31, 2008, the entire content of which is incorporated herein by reference.

FIELD OF THE INVENTION

The invention relates to a defense communication mode for an appliance able to communicate by means of various communication services. It relates more specifically to an appliance and a communication method implementing such a communication mode.

BACKGROUND

The invention applies to the technical field of machine-to-machine (M2M) communications. In these communication techniques, there are two machine categories to be considered:
  the first category consists of appliances intended to be controlled remotely and including an embedded application; the category covers, for example, automatic drinks dispensers, water meters, etc.;
  the second category comprises computer systems incorporating a management application intended to communicate with an application embedded in an appliance in order to implement the remote management of this appliance.

The remote management of appliance can affect various aspects: the supervision of the appliance, the way it is remotely driven, the remote configuration and updating of the appliance or even the implementation of remote monitoring, telemetry, teledetection and other such functions. This remote management is more often than not handled by message interchanges between the embedded application and the management application.

In the field of M2M communications, the correct operation of the remotely supervised appliances is essential. Unlike the computer terminals of the personal computer type or the cell phone-type terminals that have at least one associated user, the M2M appliances to be supervised are not designed to withstand a computer attack or piracy attempt originating from a third party entity on the telecommunication network. In particular, no user is likely to intervene or take a decision at the moment when the computer attack or piracy attempt is detected on the terminal.

The inventors have therefore identified the need for an appliance protection solution that can be implemented without the intervention of a user.

SUMMARY

The subject of the invention, according to a first aspect, is an appliance able to communicate via a communication network by means of various communication services available for transmitting data via said communication network, said appliance comprising:
  means of detecting an anomaly in a communication that is established or to be established with said appliance by means of one of said communication services,
  means of implementing a defense communication mode in which the communications intended to be established with said appliance by means of a communication service for which a detection has occurred are inhibited, the communications intended to be established by means of another said communication service being allowed.

The invention provides for the implementation of a local self-defense mechanism, this mechanism being applied to the communications established by means of the communication service for which an anomaly has been detected.

The implementation of the local self-defense mechanism can be entirely automated, requiring no intervention on the part of a user, but being based solely on a detection of anomalies and the implementation of a local protection based on restricting the possibilities of communication with the appliance.

The local self-defense mechanism is chosen so as to be targeted on and appropriate to the detected anomaly, because it depends on the communication service for which an anomaly has been detected.

The invention exploits the fact that the appliance is able to communicate by means of various communication services. Unlike the terminals that use just one communication service, it is possible to envisage rejecting or inhibiting any communication by means of one of the communication services, because the appliance retains the possibility of communicating by means of other communication services for which no attack or anomaly has been detected.

The subject of the invention, according to a second aspect, is a communication method implemented by an appliance able to communicate via a communication network by means of various communication services, said method comprising,
  a step for implementing means of detecting an anomaly in a communication established with said appliance by means of one of said communication services,
  a step for implementing a defense communication mode in which the communications intended to be established with said appliance by means of a communication service for which a detection has occurred are inhibited, the communications intended to be established by means of another communication service being allowed.

The advantages stated for the appliance according to the invention can be transposed directly to the method according to the invention.

According to a preferred implementation, the various steps of the method according to the invention are implemented by a software package or computer program, this software comprising software instructions intended to be executed by a data processor of an appliance and designed to control the execution of the various steps of this method.

Consequently, the invention also targets a program, likely to be executed by a computer or by a data processor, this program comprising instructions for controlling the execution of the steps of a method as mentioned hereinabove.

This program can use any programming language, and be in the form of source code, object code, or intermediate code between source code and object code, such as in a partially compiled form, or in any other desirable form.

The invention also targets an information medium that can be read by a computer or data processor, and containing instructions of a program as mentioned hereinabove.

The information medium can be any entity or device capable of storing the program. For example, the medium may comprise a storage means, such as a ROM, for example a CD ROM or a microelectronic circuit ROM, or even a magnetic storage means, for example a diskette (floppy disc) or a hard disk.

Also, the information medium may be a transmissible medium such as an electrical or optical signal, which can be routed via an electrical or optical cable, by radio or by other means. The program according to the invention can in particular be downloaded over an Internet-type network.

Advantageously, the information medium may be an integrated circuit incorporating the program, the circuit being designed to execute or to be used in the execution of the method concerned.

According to another implementation, the invention is implemented by means of software and/or hardware components. In this regard, the term "module" may correspond in this document equally to a software component or to a hardware component. A software component corresponds to one or more computer programs, one or more program subroutines, or, more generally, to any element of a program designed to implement a function or set of functions. A hardware component corresponds to any element of a hardware assembly designed to implement a function or set of functions.

BRIEF DESCRIPTION OF THE DRAWINGS

Other aims, features and advantages of the invention will become apparent from the following description, given solely as a nonlimiting example, and with reference to the appended drawings in which.

DETAILED DESCRIPTION

Figure 1:
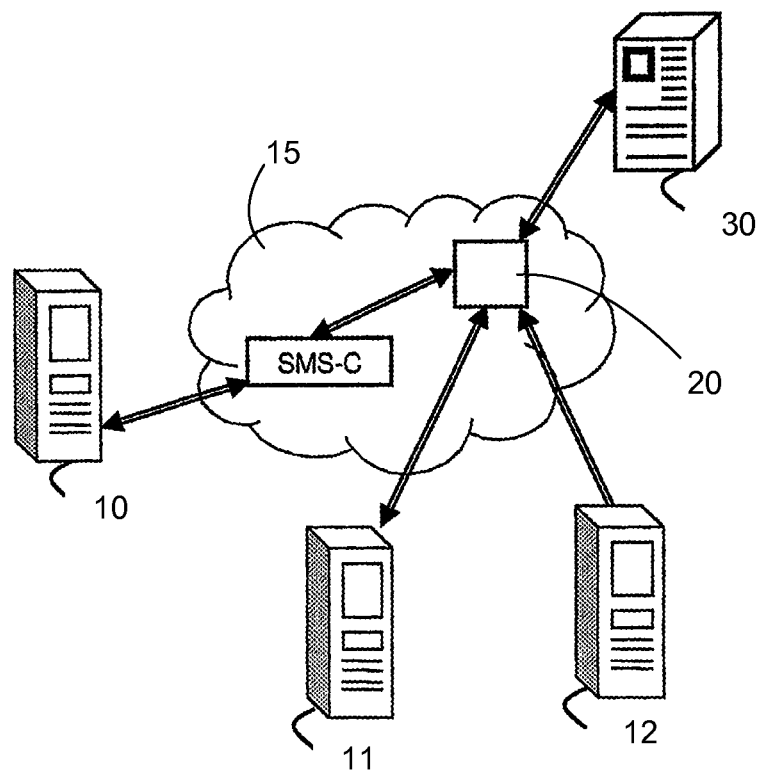
FIG. 1 schematically represents a communication system including an appliance according to the invention.

FIG. 1 diagrammatically represents a communication system including an appliance 10 according to the invention. This appliance 10 is able to communicate via a communication network 15, optionally via a service platform 20, with a terminal 30 remotely managing the appliance.

A communication between the appliance 10 and the terminal 30 is established either in message mode or in session mode. The appliance 10 is therefore designed to communicate by means of various communication services compatible with the communication network 15 and available for transmitting data via the network 15, whether message mode or session mode communication services. The message mode communications are conducted by means of messages or packets, conveying data to be transmitted, whereas the session mode communications allow a datastream to be established between two entities.

Hereinafter in the description, it is assumed, by way of example, that the communication network 15 is a cellular network, of GSM (Global System for Mobile communication) type. In this network, the various communication services available are, for example, as follows:
- the Short Message Service SMS or Multimedia Message Service MMS,
- the Unstructured Supplementary Service Data USSD service,
- the Circuit Switched Data CSD or High Speed Circuit Switched Data HSCSD service,
- the General Packet Radio Service GPRS.

These various communication services allow a message to be sent from one entity of the network to another entity.

The appliance 10 is provided with a communication interface enabling the appliance 10 to access the telecommunication network 15 and establish session mode or message mode communications via this network. This communication interface comprises a modem compatible with the nature of the network 15, in this case a GSM modem.

The appliance 10 comprises a message processing module for processing messages received via the communication interface and establishing any response messages to the messages received. The processing module is coupled with a memory for storing the messages received pending processing.

The appliance 10 also comprises a detection module, the function of which is to detect, in a communication established with the appliance, one or more anomalies, from a list of predefined anomalies. In the context of the invention, interest is more particularly focused on the anomalies that constitute a potential threat or risk to the integrity and the safety of the appliance 10. However, the invention can also be applied to purely functional anomalies not resulting from any malicious intent.

As an example, the anomalies below are likely to be detected by the detection module.

In the case of a communication established by means of the SMS service, the anomaly detected is, for example, the reception of a large number of messages, greater than a threshold value. Such an anomaly leads to an increase in the message response time of the appliance and therefore reduces its performance levels, notably its capacity to respond to the messages received within the desired time. When the appliance is battery-powered, this anomaly leads to an unnecessary energy consumption and an excessively fast discharging of the battery. Furthermore, when such an anomaly reaches a high degree and causes the received message storage memory to be filled, it makes it impossible for the appliance 10 to receive other messages, in particular useful messages.

In the case of a communication established by means of the CSD service, the anomaly detected is, for example, the receipt of communication requests at high frequency, above a threshold value. Such an anomaly prevents the appliance 10 from receiving useful requests to communicate with the service or in any case reduces its capacity to receive and process such calls.

In the case of a communication established by means of the GPRS service, using the IP (Internet Protocol) protocol, and when the appliance 10 is connected in PDP context open, the anomaly detected is, for example, the receipt of a large number of connection requests. Such an anomaly generates a cost chargeable to the subscriber associated with the appliance 10 and unnecessarily busies the resources of the appliance 10.

In the case of a communication established by means of the HTTP protocol using IP, and when the appliance 10 comprises a server module for storing authentication data, attacks in the form of Denial of Service or brute force cracking aiming to obtain authentication data from a remote terminal result in the unavailability of the appliance 10, and even risk compromising the integrity of the authentication data stored by the server.

The detection module is designed to analyze the incoming communications and perform measurement or counting operations in order to, depending on the communication service used to establish an incoming communication, determine the presence of an anomaly, that is to say, determine whether at least one given criterion associated with the communication service used is satisfied by the measured or discounted value or values.

For example, in the case of a communication established by means of the SMS service, the detection module counts the number of messages received and simultaneously present in the storage memory and flags the presence of an anomaly when this number is greater than a given threshold value.

According to another example, in the case of a communication established by means of the CSD service, the detection module measures the frequency of the CSD calls by counting the number of calls received during a given time period and flags the presence of an anomaly when this number is greater than a given threshold value.

If an anomaly is detected for a given communication service, the detection module is designed to flag this detection to a communication management module of the appliance.

The communication management module is designed to implement, instead of the normal communication mode, a defense communication mode consisting in restricting, by comparison with the normal communication mode, the acceptance or establishment of communications by the appliance 10 when these communications are established by means of a communication service for which a detection has occurred.

Preferably, the switch to the defense communication mode or "self-defense" mode is performed immediately when an anomaly is first detected to prevent the appliance 10 from being exposed for too long to the external attacks originating from an entity of the network 15.

The communication management module is designed for example, to reject or disregard any communication request received by the appliance 10 when this communication is intended to be established by means of the communication service for which a detection has occurred.

According to a variant, the communication management module is designed to inhibit any establishment by the appliance 10 of a communication by means of a communication service for which a detection has occurred.

The invention exploits the fact that the equipment is able to communicate by means of various communication services. It is therefore possible to envisage rejecting or inhibiting any communication by means of one of the communication services, while retaining the possibility of communicating by means of other communication services for which no attack or anomaly has been detected. The protection is optimal, since the possibilities of establishing an incoming, or even outgoing, communication are eliminated.

Furthermore, this type of protection can be put in place simply and automatically following the detection of an attack or an abnormal behavior via one of the communication services.

According to another variant, the communication management module is designed, when the communication service for which a detection has occurred is a message-based communication service, to inhibit or stop all of the processing of messages sent by means of this message-based communication service.

According to yet another variant, the communication management module is designed, when the communication service is a message-based communication service, to inhibit the routing of messages to the appliance by saturating the storage memory for messages received by the appliance 10.

According to yet another variant, the communication management module is designed to request a modification of an identifier assigned to the appliance and the knowledge of which is necessary to establish a communication with the appliance 10. This identifier is typically an address of the appliance 10.

According to yet another variant, the communication management module is designed to, in the case of detection, send an alert to a service platform by means of a communication service other than the communication service for which a detection has occurred. This service platform, is, for example, a platform through which the communications intended for the appliance 10 pass, or a remote management platform for this appliance.

The different variants described hereinabove can be combined together depending on the need and/or the nature or the gravity of the anomaly detected. For example, depending on the frequency of the call attempts using the CSD service and detected as being anomalies, an increasingly protective mechanism may be put in place, firstly by not answering the CSD calls, then by rejecting the CSD calls, and then finally by inhibiting any communication via the CSD service.

To ensure that a defense mechanism is implemented that is appropriate to the anomaly or attack detected, the variant used is selected according to the communication service for which the detection has occurred and/or the nature and/or the gravity of the anomaly detected.

Various exemplary appropriate defense mechanisms are given below.

First Example

Case of an Anomaly Detected for the CSD Service

The anomaly detected is the receipt of communication requests at high frequency. In this case, the appliance 10 does not respond to a communication request or rejects such a request. Rejecting a communication request has the advantage, if a non-rechargeable battery is being used, of saving the battery of the appliance and extending the life of the battery.

In addition, the appliance 10 uses a communication service other than the CSD service, for example the SMS or USSD service, to send an alert to the service platform, which can take the necessary measures for a set of appliances. These measures consist, for example, in blocking the attacks on the remote appliances that have sent alerts and/or in warning all the appliances, in order to make all the appliances switch over preventively to self-defense mode.

Second Example

Case of an Anomaly Detected for the SMS Service

The anomaly detected is the receipt of a large number of messages. In this case, the appliance 10 interrupts the processing of the incoming messages received by means of the SMS service. If, after this interruption, other messages are received, the storage memory for received SMS messages continues to be filled. When the maximum storage capacity is reached, the subsequent SMS messages are no longer transmitted to the appliance 10 but temporarily stored in a message server center of the network 15 (SMS-C, SMS Center), responsible for the routing of these messages. Consequently, the message server center no longer transmits SMS messages to the appliance 10. This causes the resources of the appliance 10 to be freed up.

The appliance 10 then filters the received messages stored in the storage memory and processes the authorized messages and/or disregards the non-authorized messages. In addition, the appliance 10 uses, if necessary, at least temporarily, a communication service other than the SMS service to send messages.

In addition, the appliance 10 uses a communication service, different from the SMS service, to send an alert to a service platform which can take the necessary measures for a set of appliances, like those described above in the case of the first example. In this case, the sending of the alert message may also be carried out by means of the SMS service.

Third Example

Case of an Anomaly Detected for the GPRS Service

The anomaly detected is the receipt of a large number of connection requests. In this case, the appliance 10 disconnects from the GPRS network, thus inhibiting any possibility of receiving or establishing a communication by means of the GPRS service.

In the case where the appliance 10 does not have a fixed IP address, the appliance 10 will automatically reconnect to the GPRS network in order to obtain a new IP address.

If the appliance 10 has a fixed IP address, the appliance 10 uses a communication service other than GPRS server, for example the SMS or USSD service, to send an alert to a service platform which can take the necessary measures for a set of appliances, like those described above in the case of the first example. The appliance 10 then waits to receive a message from the platform, by means, for example, of the SMS service before reconnecting. When the necessary measures have been taken, the service platform notifies this to the appliance 10 which can then connect to the GPRS network with the same fixed IP address.

Figure 2:
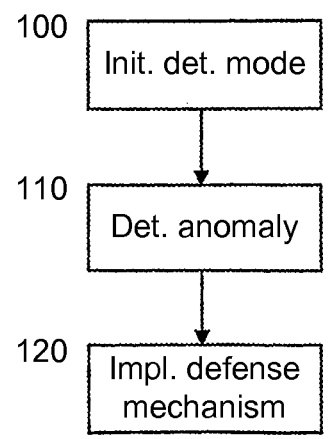
FIG. 2 is a flow diagram of one embodiment of the method according to the invention.

An embodiment of the method according to the invention is now described with reference to FIG. 2. This method comprises the steps 100 to 120 which are executed repetitively. The step 100 is preferably executed permanently, the steps 110 and 120 being executed if a detection is made in the step 100.

In the step 100, the appliance's detection module is initialized. From this moment, the detection module analyzes each incoming communication, by measurement or counting, according to the above description.

If, in the step 100, an anomaly is detected that is contained in a predefined list of anomalies, the detection module, in the step 110, informs the communication management module of this detection, indicating to it in particular the communication service for which the detection has occurred and the nature of the anomaly and its amplitude (measured or discounted value).

In the step 120, the communication management module implements an appropriate defense mechanism. The selected defense mechanism depends on the detection made, in particular the communication service for which the detection has occurred and the nature of its anomaly and its amplitude. This defense mechanism is applied to the communications established via the communication service for which a detection has occurred. The appliance 10 is then able to continue to communicate by means of other communication services that are available to it, but for which no anomaly or attack has been detected.

The invention is broadly applicable to any kind of appliance. It is particularly advantageously applicable in the M2M domain for which terminals cooperate with a centralized platform to implement the services that need to be reliable, without necessarily requiring human intervention.

The invention in particular makes it possible to automate the implementation of a local self-defense mechanism, intended to protect the appliance implementing this mechanism.

The invention also makes it possible to limit the energy consumed by the appliance. In particular, if a non-rechargeable long-life battery is used, the life of the battery is extended.

The invention also makes it possible to reduce communication costs by limiting the number of incoming messages, and more generally, to increase the quality of service of the communications with the appliances concerned and the security of these appliances.

The invention claimed is:

1. A system comprising a service platform and an appliance that communicates with the service platform via a communication network via various communication services available for transmitting data via said communication network from said appliance to the service platform, said appliance comprising:
   a hardware component operative to implement a detector element that detects an anomaly in a communication that is established or to be established with said appliance via one of said communication services; and
   a hardware component operative to implement a defense communication mode algorithm that
      inhibits the communications to be established via said communication network with said appliance via a communication service for which a detection has occurred, the communications to be established via another said communication service that is different from the communication service for which a detection has occurred being allowed, and
      is operative, when said communication service is a message-based communication service, to inhibit any processing of the messages sent via said message transport service; and
   a hardware component operative to implement an algorithm that, in case of detection, sends an alert to a service platform, which can take necessary measures for a set of appliances, via said communication network via said another communication service;
   wherein the platform, after receipt of said alert, triggers a switch over to said defense communication mode of the appliances of a set of appliances communicating with said service platform.

2. A system comprising a service platform and an appliance that communicates with the service platform via a communication network via various communication services available for transmitting data via said communication network from said appliance to the service platform, said appliance comprising:
   a hardware component operative to implement a detector element that detects an anomaly in a communication that is established or to be established with said appliance via one of said communication services; and
   a hardware component operative to implement a defense communication mode algorithm that
      inhibits the communications to be established via said communication network with said appliance via a communication service for which a detection has occurred, the communications to be established via another said communication service that is different from the communication service for which a detection has occurred being allowed, and
      is operative, when said communication service is a message-based communication service, to inhibit the routing to said appliance, of messages by saturation of a memory for storing the messages received by said appliance; and a hardware component operative to implement an algorithm that, in case of detection, sends an alert to a service platform, which can take necessary measures for a set of appliances, via said communication network via said another communication service;

wherein the platform, after receipt of said alert, triggers a switch over to said defense communication mode of the appliances of a set of appliances communicating with said service platform.

3. A system comprising a service platform and an appliance that communicates with the service platform via a communication network via various communication services available for transmitting data via said communication network from said appliance to the service platform, said appliance comprising:

a hardware component operative to implement a detector element that detects an anomaly in a communication that is established or to be established with said appliance via one of said communication services; and a hardware component operative to implement a defense communication mode algorithm that inhibits the communications to be established via said communication network with said appliance via a communication service for which a detection has occurred, the communications to be established via another said communication service that is different from the communication service for which a detection has occurred being allowed, and is operative to modify an identifier assigned to said appliance and knowledge of which is necessary to establish a communication with said appliance; and a hardware component operative to implement an algorithm that, in case of detection, sends an alert to a service platform, which can take necessary measures for a set of appliances, via said communication network via said another communication service;

wherein the platform, after receipt of said alert, triggers a switch over to said defense communication mode of the appliances of a set of appliances communicating with said service platform.

* * * * *